United States Patent [19]

Davis

[11] Patent Number: 5,413,012
[45] Date of Patent: May 9, 1995

[54] VARIABLE SYNCHRONOUS WINDOW

[75] Inventor: Alan R. Davis, Plainwell, Mich.

[73] Assignee: Eaton Corporation, Cleveland, Ohio

[21] Appl. No.: 116,627

[22] Filed: Sep. 7, 1993

[51] Int. Cl.$^6$ ............................................. B60K 41/10
[52] U.S. Cl. ......................................... 74/335; 477/78;
477/124; 364/424.1
[58] Field of Search .................... 477/78, 124, 77;
364/424.1; 74/335, 336 R, 745

[56] References Cited

U.S. PATENT DOCUMENTS

| | | | |
|---|---|---|---|
| 3,105,395 | 10/1963 | Perkins | 74/745 |
| 3,283,613 | 11/1966 | Perkins | 74/745 |
| 3,894,621 | 7/1975 | Quick | 192/190 R |
| 4,361,060 | 11/1982 | Smyth | 74/866 |
| 4,445,393 | 1/1984 | Braun | 74/346 |
| 4,527,447 | 7/1985 | Richards | 477/78 |
| 4,576,065 | 3/1986 | Speranza et al. | 74/866 |
| 4,595,986 | 6/1986 | Daubenspeck et al. | 364/424.1 |
| 4,614,126 | 9/1986 | Edelen et al. | 74/333 |
| 4,648,290 | 3/1987 | Dunkley et al. | 74/866 |
| 4,676,115 | 6/1987 | Morscheck et al. | 74/339 |
| 4,754,665 | 7/1988 | Vandervoort | 74/745 |
| 4,783,743 | 11/1988 | Yashiki et al. | 364/424.1 |
| 4,784,019 | 11/1988 | Morscheck | 74/336 |
| 4,785,917 | 11/1988 | Tateno et al. | 477/78 |
| 4,873,881 | 10/1989 | Edelen et al. | 74/336 |
| 4,899,607 | 2/1990 | Stainton | 74/335 |
| 4,949,589 | 8/1990 | Reynolds | 74/363 |
| 5,042,327 | 8/1991 | Stainton | 477/124 |
| 5,050,427 | 9/1991 | Cote et al. | 73/118.1 |
| 5,052,535 | 10/1991 | Vandervoort et al. | 192/67 R |
| 5,053,961 | 10/1991 | Genise | 364/424.1 |
| 5,081,588 | 1/1992 | Holmes et al. | 364/424.1 |
| 5,089,962 | 2/1992 | Steeby | 364/424.1 |
| 5,136,897 | 8/1992 | Boardman | 74/866 |
| 5,193,410 | 3/1993 | Stine et al. | 74/336 R |

Primary Examiner—Charles A. Marmor
Assistant Examiner—Nathan O. Jensen
Attorney, Agent, or Firm—Howard D. Gordon

[57] ABSTRACT

A control system/method for controlling the shifting of automated mechanical transmission systems (10) is provided. The control system/method (FIG. 4) defines the synchronous window $((OS*GR_T)+X \geq IS_E > (OS*GR_T)-Y)$ for jaw clutch engagement (for shifts other than compound upshifts) where X and Y are each greater than zero and the total synchronous window $(X+Y)$ equals the greater of a function $(fGR_T)$ of the numerical value of the target ratio $(GR_T)$ or a minimum value $((X+Y)$ min).

10 Claims, 5 Drawing Sheets

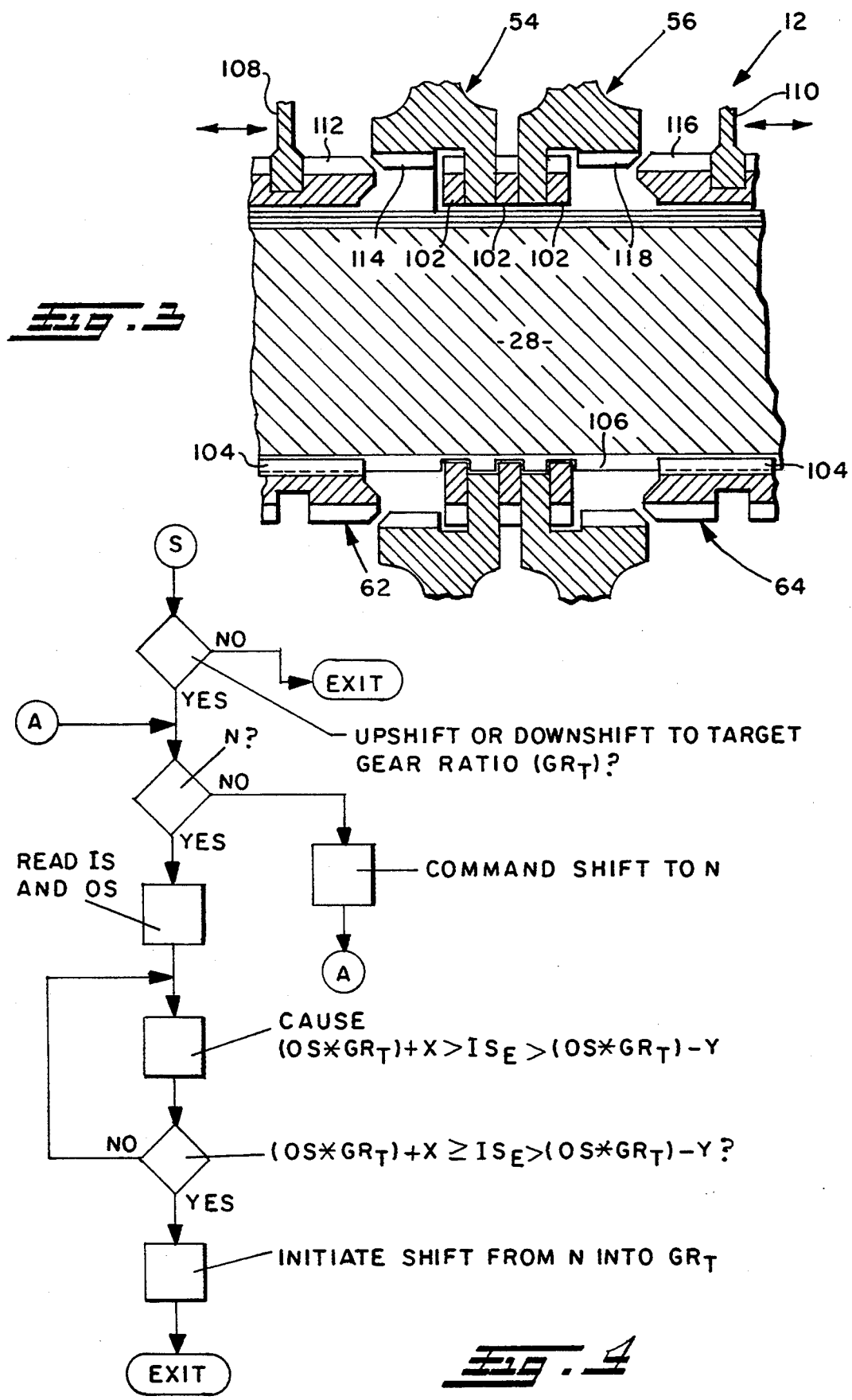

|  | SPEED | NUMERICAL GEAR RATIO (GR) | (X+Y) MIN OR $fGR_T$ | SYNCH WINDOW |
|---|---|---|---|---|
|  | 10TH | 1.00 | 45 | +23/-22 |
|  | 9TH | 1.27 | 45 | +23/-22 |
|  | 8TH | 1.65 | 45 | +23/-22 |
|  | 7TH | 2.14 | 45 | +23/-22 |
|  | 6TH | 2.79 | 45 | +23/-22 |
| RANGE SHIFT |  |  |  |  |
|  | 5TH | 3.57 | 52 | +26/-26 |
|  | 4TH | 4.54 | 72 | +36/-36 |
|  | 3RD | 5.90 | 99 | +50/-49 |
|  | 2ND | 7.63 | 134 | +72/-72 |
|  | 1ST | 9.96 | 180 | +90/-90 |
|  | REV H | 2.76 | 45 | +23/-23 |
|  | REV L | 9.84 | 178 | +79/-79 |

$fGR_T = (20*GR_T) - 19$ $(X+Y)_{MIN} = 45$

FIG. 5

VARIABLE SYNCHRONOUS WINDOW

RELATED APPLICATIONS

This application is related to U.S. Ser. No. 08/116,626, titled AUTOMATED MECHANICAL TRANSMISSION CONTROL SYSTEM/METHOD filed the same day, Sep. 7, 1993, and assigned to the same assignee, Eaton Corporation, as this application.

BACKGROUND OF THE INVENTION

1. Field of the Invention

The present invention relates to a control system/method for controlling the engagement of positive jaw clutches in an at least partially automated vehicular mechanical transmission system. More particularly, the present invention relates to a control system/method for an automated vehicular mechanical transmission system which will cause or bias the transmission jaw clutches to engage at a time when input shaft speed is expected to be within a range of true synchronous speed, called the synchronous window, the extent of which is a function of the numerical value of the target gear ratio until a minimum value is reached.

2. Description of the Prior Art

Fully or partially automated mechanical transmission systems for vehicles, such as heavy duty tractor—semi-trailer vehicles, are well known in the prior art as may be seen by reference to U.S. Pat. Nos. 4,361,060; 4,595,986; 4,614,126; 4,648,290; 4,676,115; 4,784,019; 4,874,881; 4,899,607; 5,050,427 and 5,136,897, the disclosures of all of which are incorporated herein by reference. Briefly, these automated transmission systems typically utilized sensors to provide information such as drive mode or shift selection, throttle pedal position, currently engaged ratio and engine, input shaft and/or output shaft speeds to a controller. The controller, typically microprocessor based, would process these inputs according to predetermined logic rules to issue command output signals to various actuators such as an engine fueling device, a master clutch operator and/or a transmission shift actuator. Engine fueling manipulation, an input shaft or engine brake and/or a power synchronizer were typically used to cause the input shaft and its associated gearing to rotate at a substantially synchronous rotational speed relative to the output shaft rotational speed and target gear ratio.

In view of the known response times for the various actuators, as the input shaft speed ("IS") approached the synchronous window, i.e. the product of output shaft speed times the numerical value of the target gear ratio (OS *$GR_{TARGET}$) plus or minus an acceptable value (usually about±40 RPM), the jaw clutches associated with the target gear ratio were commanded to engage with the expectation that the expected input shaft speed ($IS_E$) would be within the acceptable range as the target ratio jaw clutch members came into initial engagement.

While the prior an vehicular automated mechanical transmission system controls were generally satisfactory and provided well synchronized jaw clutch engagement, they were not totally satisfactory as, at the lower speed ratios (higher numerical reduction ratios), the synchronous windows were more restricted than necessary making achieving synchronous more difficult or time-consuming than necessary.

SUMMARY OF THE INVENTION

In accordance with the present invention, the drawbacks of the prior art are overcome or minimized by the provision of a vehicular fully or partially automated mechanical transmission system control method/system which, for both upshifts and downshifts, will tend to cause jaw clutch engagement when $(OS*GR_T)+X \geq IS_E \geq (OS*GR_T) - Y$ where:

$IS_E$=expected input shaft speed,
OS=output shaft speed,
$GR_T$=the numerical value of the gear reduction in the target ratio,
$X \geq 0$
$Y \geq 0$, and
$X+Y$=a function of $GR_T$ or a minimum value $(X+Y)_{MIN}$, whichever is greater.

The value to the function is related of the most harsh acceptable shift in a particular ratio, see for example, U.S. Pat. No. 5,052,535, the disclosure of which is incorporated herein by reference.

In the lower gear ratios (higher numerical gear reductions), the value of $X+Y$ will vary with the value of the numerical gear reduction of the target gear ratio until a minimum value, $(X+Y)_{MIN}$, is reached, such as 30 RPM.

A possible exception to the above embodiments will occur with range type compound transmissions, see U.S. Pat. No. 5,193,410, the disclosure of which is incorporated herein by reference, where, in a compound range upshift, to assure proper operation of the range section synchronizers, shift quality may be compromised by biasing the transmission to engage the main section jaw clutch of the target gear ratio such that $(OS*GR) > IS \geq (OS*GR) - K$ where K is a positive RPM.

In the following descriptions of the preferred embodiments, this possible exception will be understood.

Accordingly, it is an object of the present invention to provide a control system/method for a vehicular at least partially automated mechanical transmission system which will sequence jaw clutch engagement to occur, or tend to occur, for the lower speed ratios, more quickly and easily than in the prior art.

This and other objects and advantages of the present invention will become apparent from a reading of the description of the preferred embodiment taken with the drawings.

BRIEF DESCRIPTION OF THE DRAWINGS

FIG. 3 is a partial cross-sectional view of a typical positive jaw clutch assembly utilized in the automated mechanical transmission systems of FIGS. 1 and 2.

FIG. 4 is a schematic illustration, in flow chart format, of the control system/method of the present invention.

FIG. 5 is a chart illustrating the numerical gear reduction ratios, and typical tolerance factor values, for a transmission of the type illustrated in FIGS. 1 and 2.

DESCRIPTION OF THE PREFERRED EMBODIMENT

Figure 1:
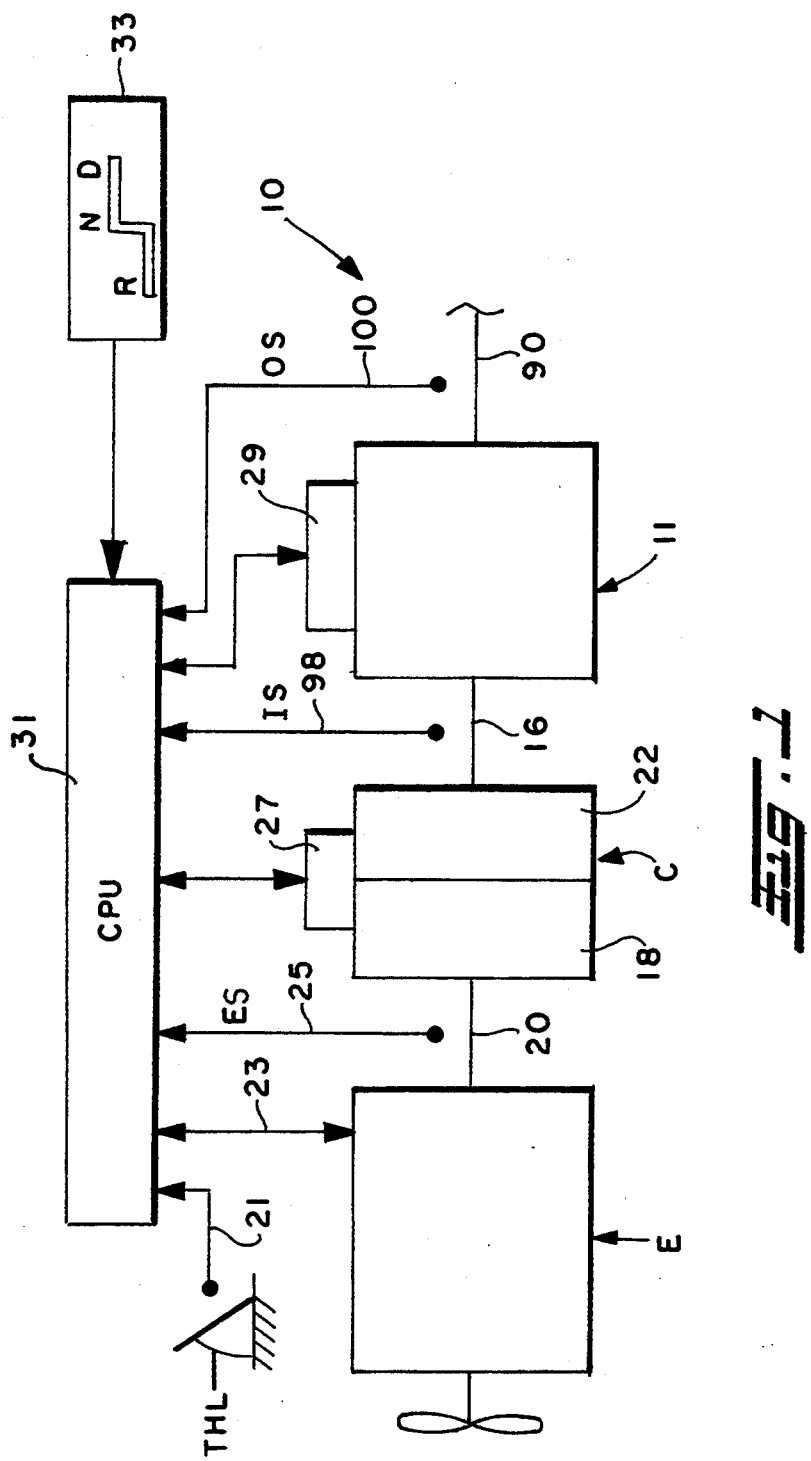
FIG. 1 is a schematic illustration of an automated mechanical transmission system of the type particularly well suited to be controlled by the control methods/system of the present invention.

Certain terminology will be used in the following description for convenience and reference only and will not be limiting. The words "upwardly", "downwardly", "rightwardly", and "leftwardly" will designate direction in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. In "synchronized clutch assemblies" relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio.

Figure 2:
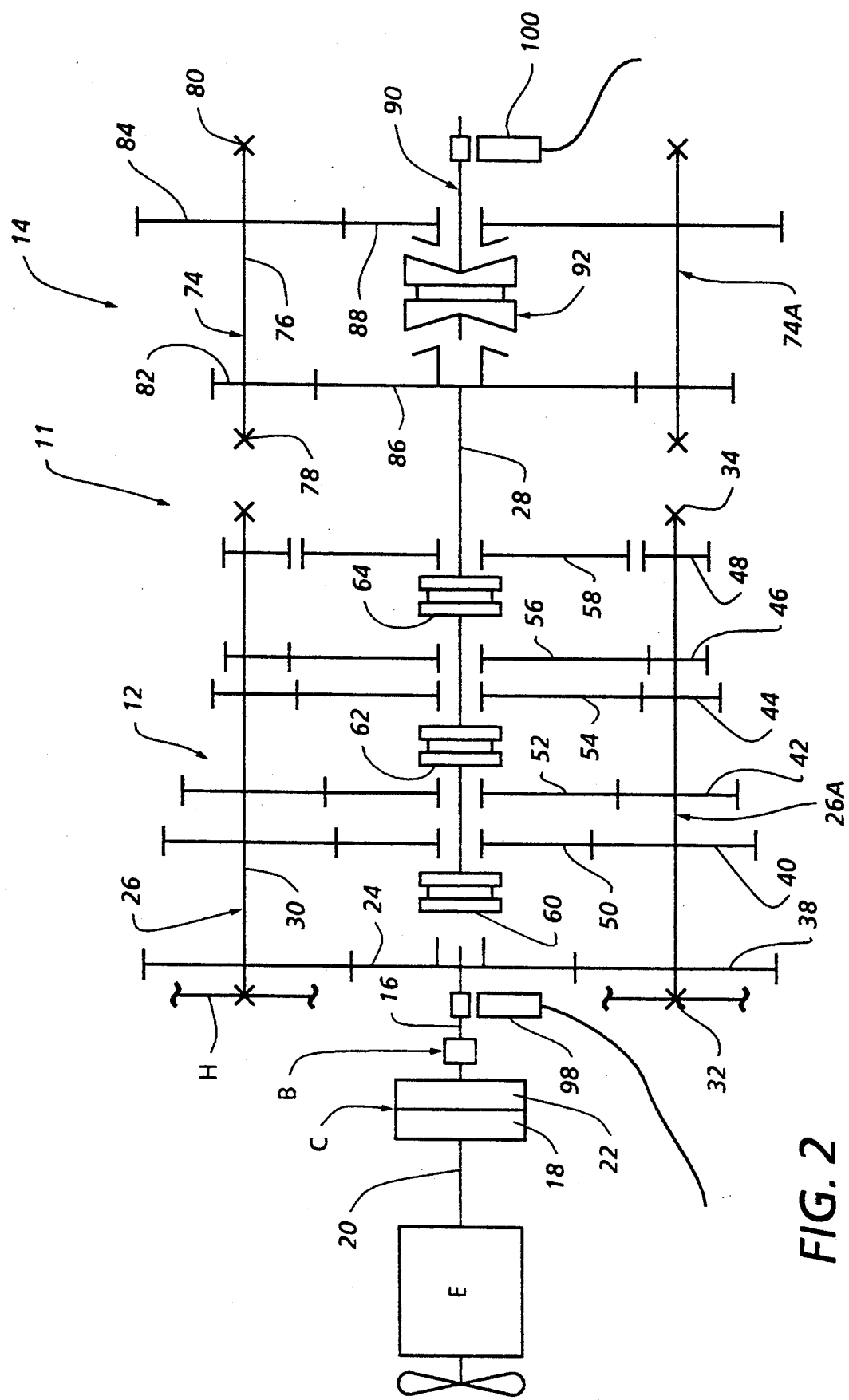
FIG. 2 is a schematic illustration of the vehicular mechanical transmission system controlled by the control system/method of the present invention.

A vehicular automated mechanical transmission system 10 of the type particularly well suited for control by the control system/method of the present invention is schematically illustrated in FIGS. 1 and 2. Fully and partially automated mechanical transmission systems are well known in the prior art as may be seen by reference to the above-mentioned U.S. Pat. Nos. 4,361,060; 4,595,986; 4,614,126; 4,648,290; 4,676,115; 4,784,019; 5,053,961 and 5,136,897.

FIG. 1 schematically illustrates a vehicular automated mechanical transmission system 10 including an automated multiple speed change gear transmission 11 driven by a fuel controlled engine E, such as a well-known diesel engine, through a coupling such as a friction master clutch C. The output of the automated transmission 11 is output shaft 90 which is adapted for driving connection to an appropriate vehicle component such as the differential of a drive axle, a transfer case, or the like, and is well known in the prior art.

The crankshaft 20 of engine E will drive the driving plates 18 of master friction clutch C which are frictionally engageable to driven plates 22 for driving the input shaft 16 of transmission 11.

The above-mentioned power train components are acted upon and/or monitored by several devices, each of which will be discussed briefly below. These devices include a throttle pedal position or throttle opening monitor assembly 21 which senses the operator set position of the operator control throttle device THL, a fuel control device 23 controlling the amount of fuel to be supplied to engine E, engine speed sensor 25 which senses the rotational speed of the engine, a clutch operator 27 which engages and disengages master clutch C and which may also provide information as to the status of the clutch, an input shaft speed sensor 98 for sensing the rotational speed of transmission input shaft 16, a transmission operator 29 which is effective to shift the transmission 11 into a selected gear ratio and to provide a signal indicative of the gear neutral condition and/or the currently engaged gear ratio, and an output shaft speed sensor 100 for sensing the rotational speed of the output shaft 90.

Figure 1A:
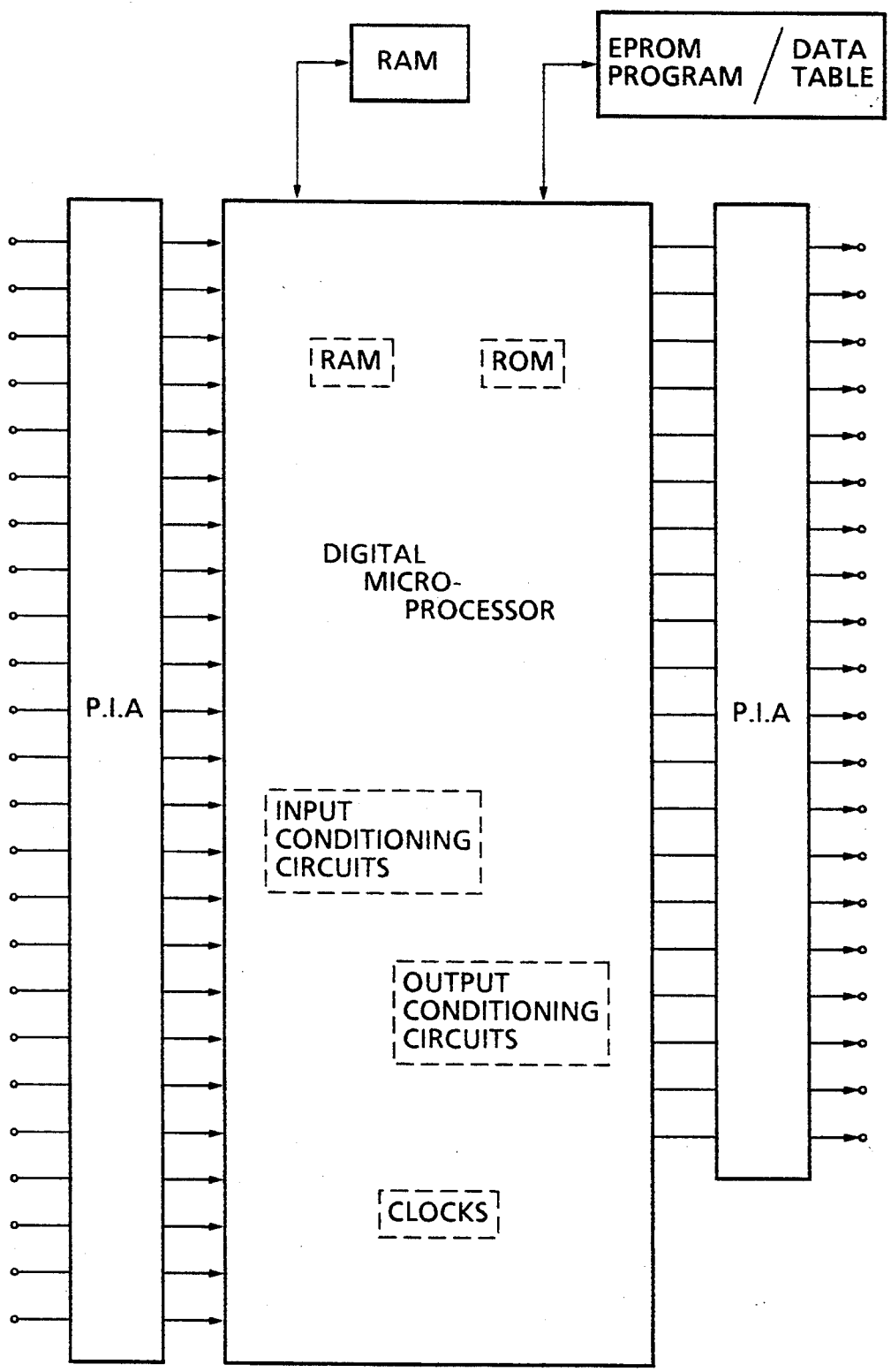
FIG. 1A is a schematic illustration of a digital microprocessor-based CPU.

The transmission shift operator 27 may be of any well-known type, examples of which may be seen by reference to above-mentioned U.S. Pat. Nos. 4,874,881 and 4,899,607. FIG. 1A is a schematic illustration of microprocessor-based CPU 31.

The above-mentioned devices supply information to and/or accept command signals from the central processing unit controller 31. The central processing unit 31 may include analog and/or digital electronic calculation and logic circuitry as is well known in the prior art. Preferably, the central processing unit will be microprocessor based, an example of which may be seen by reference to above-mentioned U.S. Pat. No. 4,595,986. The central processing unit 31 will also receive information from a shift control assembly 33 by which the vehicle operator may select a reverse (R) neutral (N) or forward drive (D) mode of operation of the vehicle. An electrical power source (not shown) and/or a source of pressurized fluid (not shown) provide electrical and/or pneumatic power to the various sensing, operating and/or processing units.

Drive train components and controls therefore of the type described above are known in the prior art and may be appreciated in greater detail by reference to U.S. Pat. Nos. 4,595,986; 4,576,065 and 4,445,393, the disclosures of all of which are hereby incorporated by reference. The sensors 21, 23, 25, 27, 98, 29 and 100 may be of any known type of construction for generating analog or digital signals proportional to the parameter monitored thereby. Similarly, operators 23, 27 and 29 may be of any known electric, pneumatic or electro-pneumatic type for executing operations in response to command output signals from the central processing unit 31.

In addition to direct inputs, the central processing unit 31 may be provided with circuitry for differentiating the input signals from at least sensors 23, 25 and/or 98 to provide a calculated signal indicative of the rotational acceleration and/or deceleration of engine, transmission input shaft and/or transmission output shaft. CPU 31 may also be provided with circuitry and logic rules to compare the input signals from sensor 98 and 100 to verify and identify that the transmission 11 is engaged in a particular gear ratio, etc.

The structural details of automated transmission 11 may be seen by reference to FIG. 2. Compound transmission 11 comprises a multiple speed main transmission section 12 connected in series with a range type auxiliary section 14. Transmission 11 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

An input shaft brake B, operated by CPU 31, is preferably provided to provide quicker upshifting as is well known in the prior art.

Transmissions similar to mechanical transmission 11 are well known in the prior an and may be appreciated by reference to U.S. Pat. Nos. 3,105,395; 3,283,613; 4,754,665 and 5,193,410, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding jaw clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the actuator 27 as well known in the prior art. Clutch collars 60, 62 and 64 may be of the well known double acting nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, if often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62 and 64 are three-position clutches in that they may be positioned in the centered, nonengaged position as illustrated, or in a fully rightwardly engaged or fully leftwardly engaged position by means of actuator 27. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly (not shown), is provided for clutching either gear 86 to mainshaft 28 for low range operation or gear 88 to mainshaft 28 for direct or high range operation of the compound transmission 10.

Although the range type auxiliary section 14 is illustrated as a two-speed section utilizing spur or helical type gearing, it is understood that the present invention is also applicable to compound transmissions utilizing splitter or combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

FIG. 3 illustrates a typical jaw clutch structure utilized with heavy duty mechanical change gear transmissions of the type automated by the control system/method of the present invention. Briefly, it may be seen that mainshaft gears 54 and 56 surround mainshaft 28 in a radially floating manner and are maintained in a predetermined axial position relative to mainshaft 28 by means of spacer members 102 as may be seen in greater detail by reference to U.S. Pat. Nos. 3,894,621 and 4,949,589, the disclosures of which are hereby incorporated by reference. Clutch collars 62 and 64 are provided with internal spline 104 which are slidably engaged with external splines 106 provided on the outer diameter surface of mainshaft 28. The clutch collars 62 and 64 are axially positioned on the mainshaft 28 by means of shift forks 108 and 110, respectively which are controlled by the shift actuator 27. Shift collar 62 is provided with jaw clutch teeth 112 which may be selectively engaged with jaw clutch teeth 114 provided on the main shaft gear 54. Shift collar 64 is provided with jaw clutch teeth 116 which may be selectively engaged with jaw clutch teeth 118 provided on the mainshaft gear 56.

As is known, to achieve a smooth engagement of gear 54 to mainshaft 28 clutch collar 62 must be moved rightwardly to bring clutch teeth 112 into engagement with clutch teeth 114 at a time when the mainshaft gear 54 is rotating at a rotational speed which is substantially equal to the rotational speed of mainshaft 28 and the clutch collar 62 which is rotating therewith. Assuming that the auxiliary range section 14 remains engaged in either the high or low speed ratio thereof, the rotational speed of the clutch collars and the mainshaft 28 will be determined by the ratio of the range section and the rotational speed of the output shaft (OS). During the time of the gear change operation in the main transmission section 12, the ground speed of the vehicle, and thus the rotational speed of output shaft 90, will remain substantially constant. The rotational speed of the mainshaft gears 54 and 56 is a function of the gear ratios thereof and the rotational speed of the input shaft 16 (IS). Accordingly, to achieve a substantially synchronous condition for engagement of one of the main shaft gears, the speed of the input shaft 16 is modulated by means of controlled fueling of engine E and/or operation of upshift brake B. As is well known in the prior art, at precisely synchronous conditions for engagement of a particular target gear ratio, $IS = OS \times GR_{TARGET}$ and, if clutch C is fully engaged without slip, $ES = IS-$ $= OS \times GR_{TARGET}$. In practice, acceptable shifts can be achieved if the jaw clutch members are out of synchronous by a predetermined amount, such as about 20 to 40 RPM. Accordingly, the synchronous shift window for engaging a particular target gear ratio will be IS=- $(OS \times GR_{TARGET}) \pm$ about 20 to 40 RPM.

In the prior art fully or partially automated transmission systems, the reaction time of the various actuators was a known or determined value, as was the rate of change of the rotational speed of the engine and/or input shaft. Based upon these parameters, as the input shaft approached a substantially synchronous speed, the ECU 31 would issue command output signals to the various actuators to initiate a shift into the selected target gear ratio with the expectation that the clutch teeth would come into engagement at a time when the expected input shaft rotational speed ($IS_E$) would equal the product of the target gear ratio multiplied by the output shaft speed plus or minus the predetermined constant value.

According to the control system/method of the present invention, schematically illustrated in flow chart format in FIG. 4, the synchronous window is defined such that the ECU will cause to tend to cause jaw clutch engagement when $(OS \times GR_{TARGET}) + X > IS_E > (OS \times GR_{TARGET}) - Y$ where:

$IS_E$=expected input shaft speed, OS=output shaft speed, $GR_{TARGET}$=the numerical value of the gear reduction in the target gear ratio, X is greater than zero, Y is greater than zero, and the sum of X+Y is the greater of a function of $GR_T$ or a minimum value where the varies with the value of $GR_T$.

Referring to the flow chart representation of the control system/method of the present invention as shown in FIG. 4, the value $IS_E$ is the expected value of the input shaft rotational speed after the passage of the period of time generally equal to that period of time for the various actuators to respond to command output signals from the CPU 31 to cause the jaw clutch teeth associated with the target gear ratio to come into initial engagement.

The value of the larger of X or Y is selected as a function of the most harsh acceptable shift in the target gear ratio, see for example, above-mentioned U.S. Pat. No. 5,052,535.

In the lower gear ratios (higher numerical gear reductions), the values of X+Y may vary with the value of the numerical gear reduction of the target gear ratio until a minimum value is reached, such as 45 RPM. Referring to FIG. 5, X+Y is taken as the greater of ((20*GR)-19) or 45.

In the lower speed, higher gear reduction, ratios, such as first (1st) through fifth (5th) speed ratios in a ten forward speed transmission, it is desirable and permissible to use a somewhat more expansive synchronous window. To assure that an upshift can be made when a vehicle is traveling tip a grade, i.e. both ES/IS and OS will be decreasing, a larger synchronous window is required. Further, in the speed ratios, the larger gear reduction will result in a lower or softer driveline spring rate which tend to dampen the harshness of an out of synchronous jaw clutch engagement.

A possible exception to the above will occur with range type compound transmissions, see above-mentioned U.S. Pat. No. 5,193,410, where, in a compound range upshift, such as 5th to 6th upshift or a 5th to 7th skip upshift, to assure proper operation of the range section synchronizers, shift quality may be compromised by causing the transmission to engage the main section jaw clutch of the target gear ratio such that the input shaft is always rotating at less than true synchronous speed, i.e. $(OS*GR) > IS \geq (OS*GR) - K$. In the descriptions of the preferred embodiments, this possible exception will be understood.

The description of the preferred embodiments of the present invention is by way of example only and various modification and/or rearrangement of the parts and/or steps thereof are contemplated without departing from the spirit and the scope of the invention as hereinafter claimed.

I claim:

1. A method for controlling dynamic non-compound shifting of a vehicular automated mechanical transmission system (10) of the type comprising a multiple-speed mechanical transmission having a plurality of selectable gear ratios (GR), each having engageable and disengageable pairs of non-blocked positive jaw clutch members (112/114, 116/118) associated therewith, said transmission having an input shaft (16) drivingly connected to a prime mover (E) by a non-positive coupling (C) and an output shaft (90) for driving connection to vehicular drive wheels, each of said pairs of positive jaw clutch members including a first jaw clutch member (114/118) drivingly associated with said input shaft and a second jaw clutch member (112/116) drivingly associated with said output shaft, a control unit (CPU) for receiving input signals including input signals indicative of input shaft rotational speed (IS) and output shaft rotational speed (OS) and for processing same according to predetermined logic rules to issue command output signals to system actuators (23, 27, 29), including a transmission actuator (27) effective to selectively engage and disengage selected pairs of said positive jaw clutch members, said transmission actuator having a response time comprising the time required for said actuator to respond to a command output signal and move a selected pair of positive jaw clutch members from a normally disengaged position to a position of initial positive engagement, said method comprising the steps of:

determining a requirement for a non-compound shift from a transmission neutral condition into a target gear ratio ($GR_T$);

determining a maximum acceptable value of difference of rotational speed of the first and second jaw clutch members associated with said target gear ratio at initial positive engagement thereof as the greater of (i) a minimum value and (ii) a function of the numerical value of the target gear ratio increasing and decreasing, respectively, with increasing and decreasing values, respectively, of said numerical value;

sensing current values of said input signals indicative of input shaft and output shaft rotational speed;

determining, as functions of at least one of (i) said current value of said input signal indicative of input shaft rotational speed, (ii) said current value of said input signal indicative of output shaft rotational speed, and (iii) said response time, values indicative of expected rotational speeds of said first and second jaw clutch members associated with said target gear ratio at initial positive engagement thereof in the event of an instantaneous command to said actuator to initiate engagement of said first and second jaw clutch members associated with said target gear ratio;

if the difference between said expected rotational speeds is no greater than said maximum acceptable value of difference, issuing command output signals to said actuator to initiate engagement of the pair of positive jaw clutch members associated with said target gear ratio; and responsive to said command output signals, causing initiation of engagement of said pair of positive jaw clutch members associated with said target gear ratio.

2. The method of claim 1 further comprising issuing command output signals to said actuators to initiate engagement of the pair of positive clutch members associated with a target gear ratio ($GR_T$) only when the expression $(OS*GR_T)+X \geq IS_E > (OS*GR_T)-Y$ is true where:

OS = output shaft speed (in RPM),
$GR_T$ = numerical ratio of the target gear ratio,
$IS_E$ = the expected input shaft speed (in RPM) at the time of initial positive engagement of the pair of positive clutch members associated with said target gear ratio,
$X > 0$,
$Y > 0$, and
$X+Y$ = the larger of $fGR_T$ or $(X+Y)_{MIN}$ where $fGR_T$ is a function of $GR_T$ increasing and decreasing in value, respectively, with increasing and decreasing values, respectively, of $GR_T$, and $(X+Y)_{MIN}$ is a constant minimum value.

3. The method of claim 2 wherein $(X+Y)_{MIN}$ equals about 45 RPM.

4. The method of claim 3 wherein $(X+Y)_{MIN}$ equals about 30 RPM.

5. A control system for controlling dynamic non-compound shifting of a vehicular automated mechanical transmission system (10) of the type comprising a multiple-speed mechanical transmission having a plurality of selectable gear ratios (GR), each having engageable and disengageable pairs of non-blocked positive jaw clutch members (112/114, 116/118) associated therewith, said transmission having an input shaft (16) drivingly connected to a prime mover (E) by a non-positive coupling (C) and an output shaft (90) for driving connection to vehicular drive wheels, each of said pairs of positive jaw clutch members including a first jaw clutch member (114/118) drivingly associated with said input shaft and a second jaw clutch member (112/116) drivingly associated with said output shaft, a control unit (CPU) for receiving input signals including input signals indicative of input shaft rotational speed (IS) and output shaft rotational speed (OS) and for processing same according to predetermined logic rules to issue command output signals to system actuators (23, 27, 29), including a transmission actuator (27) effective to selectively engage and disengage selected pairs of said positive jaw clutch members, said transmission actuator having a response time comprising the time required for said actuator to respond to a command output signal and move a selected pair of positive jaw clutch members from a normally disengaged position to a position of initial positive engagement, said control system comprising:

means for determining a requirement for a non-compound shift from a transmission neutral condition into a target gear ratio ($GR_T$);
means for determining a maximum acceptable value of difference of rotational speed of the first and second jaw clutch members associated with said target gear ratio at initial positive engagement thereof as the greater of (i) a minimum value and (ii) a function of the numerical value of the target gear ratio increasing and decreasing, respectively, with increasing and decreasing values, respectively, of said numerical value;

means for sensing current values of said input signals indicative of input shaft and output shaft rotational speed;

means for determining, as functions of at least one of (i) said current value of said input signal indicative of input shaft rotational speed, (ii) said current value of said input signal indicative of output shaft rotational speed, and (iii) said response time, values indicative of expected rotational speeds of said first and second jaw clutch members associated with said target gear ratio at initial positive engagement thereof in the event of an instantaneous command to said actuator to initiate engagement of said first and second jaw clutch members associated with said target gear ratio;

means effective, if the difference between said expected rotational speeds is no greater than said maximum acceptable value of difference, for issuing command output signals to said actuator to initiate engagement of the pair of positive jaw clutch members associated with said target gear ratio; and means, responsive to said command output signals, for causing initiation of engagement of said pair of positive jaw clutch members associated with said target gear ratio.

6. The control system of claim 5 wherein said means for issuing command output signals to said actuators to initiate engagement of the pair of positive clutch members associated with a target gear ratio ($GR_T$) issues said command output signals only when the expression $(OS*GR_T)+X \geq IS_E > (OS*GR_T)-Y$ is true where:

OS = output shaft speed (in RPM),
$GR_T$ = numerical ratio of the target gear ratio,
$IS_E$ = the expected input shaft speed (in RPM) at the time of initial positive engagement of the pair of positive clutch members associated with said target gear ratio,
$X > 0$,
$Y > 0$, and
$X+Y$ = the larger of $fGR_T$ or $(X+Y)_{MIN}$ where $fGR_T$ is a function of $GR_T$ increasing and decreasing in value, respectively, with increasing and decreasing values, respectively, of $GR_T$, and $(X+Y)_{MIN}$ is a constant minimum value.

7. The system of claim 6 wherein $(X+Y)_{MIN}$ equals about 45 RPM.

8. The system of claim 7 wherein $(X+Y)_{MIN}$ equals about 30 RPM.

9. A machine for controlling dynamic non-compound shifting of a vehicular automated mechanical transmission system (1 0) of the type comprising a multiple-speed mechanical transmission having a plurality of selectable gear ratios (GR), each having engageable and disengageable pairs of non-blocked positive jaw clutch members (112/114, 116/118) associated therewith, said transmission having an input shaft (16) drivingly connected to a prime mover (E) by a non-positive coupling (C) and an output shaft (90) for driving connection to vehicular drive wheels, each of said pairs of positive jaw clutch members including a first jaw clutch member (114/118) drivingly associated with said input shaft and a second jaw clutch member (112/116) drivingly associated with said output shaft, a control unit (CPU) for receiving input signals including input signals indicative of input shaft rotational speed (IS) and output shaft rotational speed (OS) and for processing same according to predetermined logic rules to issue command output signals to system actuators (23, 27, 29), including a transmission actuator (27) effective to selectively engage and disengage selected pairs of said positive jaw clutch members, said transmission actuator having a response time comprising the time required for said actuator to respond to a command output signal and move a selected pair of positive jaw clutch members from a normally disengaged position to a position of initial positive engagement, said machine comprising:

(1) input signal receiving means for receiving said input signals;

(2) data processing means including logic rules for:

(a) determining a requirement for a non-compound shift from a transmission neutral condition into a target gear ratio ($GR_T$);

(b) determining a maximum acceptable value of difference of rotational speed of the first and second jaw clutch members associated with said target gear ratio at initial positive engagement thereof as the greater of (i) a minimum value and (ii) a function of the numerical value of the target gear ratio increasing and decreasing, respectively, with increasing and decreasing values, respectively, of said numerical value;

(c) sensing current values of said input signals indicative of input shaft and output shaft rotational speed;

(d) determining, as functions of at least one of (i) said current value of said input signal indicative of input shaft rotational speed, (ii) said current value of said input signal indicative of output shaft rotational speed, and (iii) said response time, values indicative of expected rotational speeds of said first and second jaw clutch members associated with said target gear ratio at initial positive engagement thereof in the event of an instantaneous command to said actuator to initiate engagement of said first and second jaw clutch members associated with said target gear ratio;

(e) if the difference between said expected rotational speeds is no greater than said maximum acceptable value of difference, determining to cause issuing of command output signals to said actuator to initiate engagement of the pair of positive jaw clutch members associated with said target gear ratio; and (3) output signal issuing means for issuing said command output signals to said actuator.

10. The machine of claim 9 wherein said logic rules further comprise issuing command output signals to said actuators to initiate engagement of the pair of positive clutch members associated with a target gear ratio ($GR_T$) only when the expression $(OS*GR_T)+X \geq IS_E > (OS*GR_T)-Y$ is true where:

OS = output shaft speed (in RPM), $GR_T$ = numerical ratio of the target gear ratio, $IS_E$ = the expected input shaft speed (in RPM) at the time of initial positive engagement of the pair of positive clutch members associated with said target gear ratio, $X > 0$, $Y > 0$, and $X+Y$ = the larger of $fGR_T$ or $(X+Y)_{MIN}$ where $fGR_T$ is a function of $GR_T$ increasing and decreasing in value, respectively, with increasing and decreasing values, respectively, of $GR_T$, and $(X+Y)_{MIN}$ is a constant minimum value.

* * * * *